(12) United States Patent
Sigoure (10) Patent No.: US 10,187,286 B2
(45) Date of Patent: Jan. 22, 2019

(54) METHOD AND SYSTEM FOR TRACKING NETWORK DEVICE INFORMATION IN A NETWORK SWITCH

(71) Applicant: Arista Networks, Inc., Santa Clara, CA (US)

(72) Inventor: Benoit Sigoure, San Francisco, CA (US)

(73) Assignee: Arista Networks, Inc., Santa Clara, CA (US)

(*) Notice: Subject to any disclaimer, the term of this patent is extended or adjusted under 35 U.S.C. 154(b) by 94 days.

(21) Appl. No.: 15/162,189

(22) Filed: May 23, 2016

(65) Prior Publication Data

US 2017/0339043 A1    Nov. 23, 2017

(51) Int. Cl.
| | |
|---|---|
| *H04L 12/26* | (2006.01) |
| *H04L 12/741* | (2013.01) |
| *H04L 12/24* | (2006.01) |
| *G06F 9/50* | (2006.01) |
| *G06F 9/54* | (2006.01) |
| *G06F 11/07* | (2006.01) |
| *H04L 12/801* | (2013.01) |

(52) U.S. Cl.
CPC .......... *H04L 43/50* (2013.01); *G06F 9/5072* (2013.01); *G06F 9/54* (2013.01); *H04L 41/046* (2013.01); *H04L 41/0853* (2013.01); *H04L 43/065* (2013.01); *H04L 45/745* (2013.01); *G06F 11/0709* (2013.01); *H04L 41/0213* (2013.01); *H04L 41/12* (2013.01); *H04L 47/12* (2013.01)

(58) Field of Classification Search
CPC ...... H04L 43/50; H04L 43/065; H04L 45/745
See application file for complete search history.

(56) References Cited

U.S. PATENT DOCUMENTS

| | | | |
|---|---|---|---|
| 9,235,802 B1* | 1/2016 | Chamness | G06F 11/08 |
| 2004/0267916 A1 | 12/2004 | Chambliss et al. | |
| 2013/0235870 A1 | 9/2013 | Tripathi et al. | |
| 2014/0075327 A1 | 3/2014 | Noel et al. | |
| 2014/0269319 A1 | 9/2014 | DeCusatis et al. | |
| 2015/0092561 A1* | 4/2015 | Sigoure | H04L 49/50 |
| | | | 370/236 |
| 2015/0100675 A1 | 4/2015 | Davie et al. | |
| 2015/0358200 A1* | 12/2015 | Mahajan | H04L 41/085 |
| | | | 370/225 |
| 2015/0358209 A1* | 12/2015 | Zhang | H04L 41/0893 |
| | | | 709/221 |

OTHER PUBLICATIONS

Extended European Search Report issued in corresponding European Application No. 17172549.2, dated Oct. 25, 2017 (12 pages).

* cited by examiner

*Primary Examiner* — Jae Y Lee
(74) *Attorney, Agent, or Firm* — Chamberlain, Hrdlicka, White, Williams & Aughtry (57) ABSTRACT

In general, embodiments of the invention relate to method for processing network device information. The method includes receiving network device information (NDI) from a plurality of network devices, storing the NDI in a computer cluster, after storing the NDI, determining that a first application is registered to receive the NDI, providing the NDI to the first application, analyzing, by the first application, the NDI, and performing, based on the analysis, a first action.

20 Claims, 8 Drawing Sheets

METHOD AND SYSTEM FOR TRACKING NETWORK DEVICE INFORMATION IN A NETWORK SWITCH

BACKGROUND

Data centers typically include a large number of network devices. Given the complexity of the individual network devices and the complexity of the interaction between the various network devices, it is often difficult for a network administrator to effectively manage the network devices in the data center.

SUMMARY

In general, in one aspect, the invention relates to a method for processing network device information. The method includes, receiving network device information (NDI) from a plurality of network devices, storing the NDI in a computer cluster, after storing the NDI, determining that a first application is registered to receive the NDI, providing the NDI to the first application, analyzing, by the first application, the NDI, and performing, based on the analysis, a first action.

In general, in one aspect, the invention relates to a system. The system includes a computing system operatively connected to a plurality of network devices and to an application, and programmed to receive network device information (NDI) from a plurality of network devices; store the NDI in a computer cluster, after storing the NDI, determine that the application is registered to receive the NDI, provide the NDI to the application, receive a first NDI analysis from the application, and perform, based on the first NDI analysis, a first action. The system further includes the application programmed to: receive the NDI from the computing system, analyze the NDI to obtain the first NDI analysis, and provide the first NDI analysis to the computing system.

In general, in one aspect, the invention relates to a non-transitory computer readable medium comprising computer readable program code, which when executed by a processor enables the processor to: receive network device information (NDI) from a plurality of network devices, store the NDI in a computer cluster, after storing the NDI, determine that a first application is registered to receive the NDI, provide the NDI to the first application, analyze, by the first application, the NDI, and perform, based on the analysis, a first action.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for tracking state information for multiple network devices, analyzing the state information, and then performing an action(s) based on the results of the analysis of the state information.

Figure 1A:
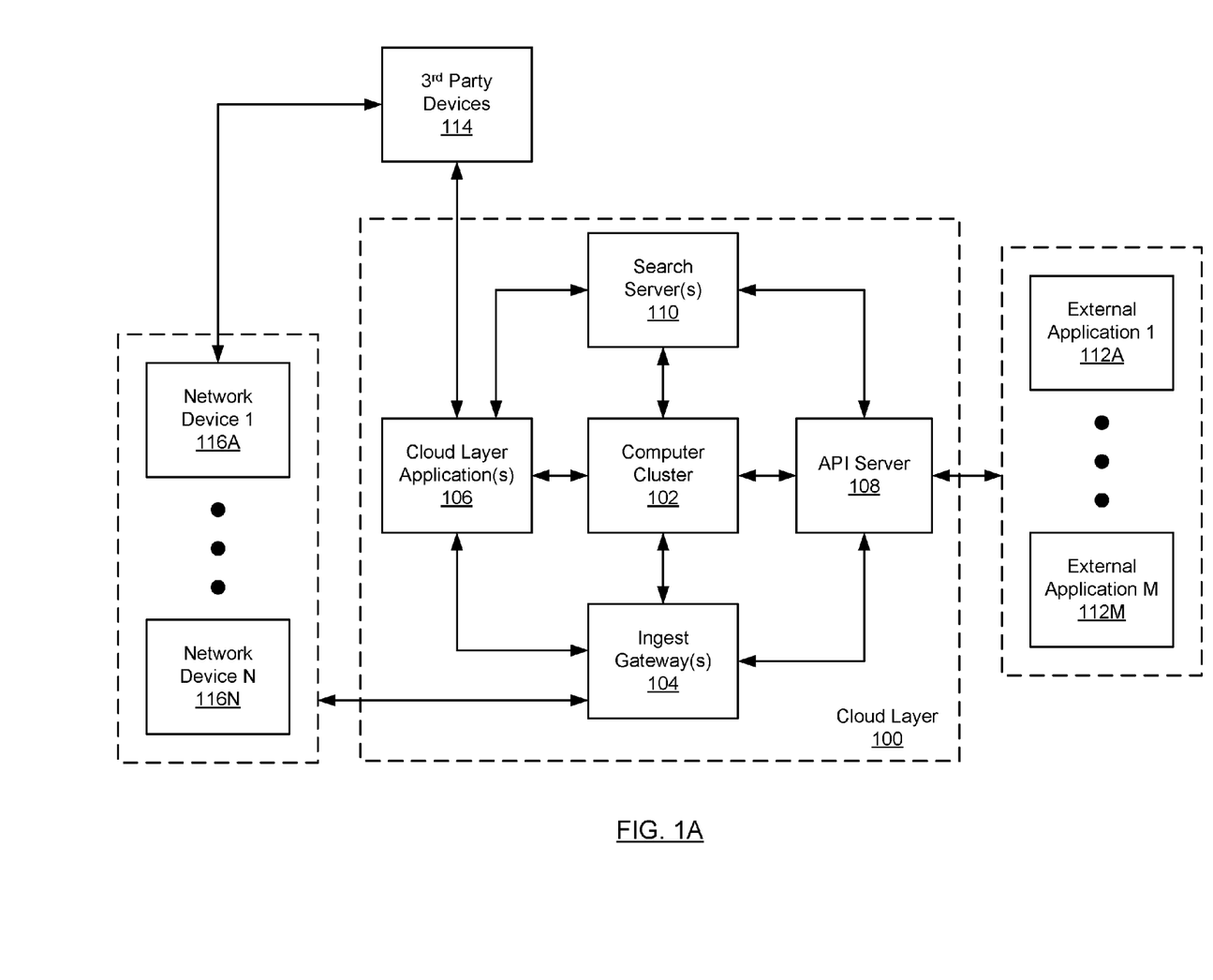
FIG. 1A shows a system in accordance with one or more embodiments of the invention.

FIG. 1A shows a system in accordance with one or more embodiments of the invention. The system includes one or more network devices (116A, 116N), a cloud layer (100), one or more $3^{rd}$ party devices (114), and one or more external applications (112A, 112M). The aforementioned components may be operatively connected to each other using any combination of wired or wireless connections. Further, the aforementioned components may communicate with each other using any combination of wired and/or wireless communication protocols (including telecommunication protocols). Each of these components is described below.

In one embodiment of the invention, a network device (116A, 116N) is a physical device that includes persistent storage, memory (e.g., Random Access Memory), one or more processors (including a switch chip), and two or more physical ports. In one or more embodiments of the invention, the switch chip is hardware that determines which egress port on a switch to forward media access control (MAC) frames. The switch chip may include egress and ingress ports that may connect to ports on the switch. Each port may or may not be connected to another device on a network (e.g., a server, a switch, a router, etc.). The network device may be configured to receive packets via the ports and determine whether to (i) drop the packet, (ii) process the packet in accordance with one or more embodiments of the invention, and/or (iii) send the packet, based on the processing, out another port on the network device.

How the network device makes the determination of whether to drop the packet, and/or send the packet to another device on the network depends, in part, on whether the network device is a layer-2 (L2) switch or a layer-3 (L3) switch (also referred to as a multi-layer switch), which may perform at least some functions of a router. If the network device is operating as a L2 switch, the network device uses the destination MAC address along with a forwarding table to determine out of which port to send the packet. If the network device is operating as a L3 switch, the network device uses the destination IP address along with a routing table to determine out of which port to send the packet, and includes the ability to write the MAC address of the next device to receive the packet in place of its own MAC address (which the last device to send the packet wrote) in the L2 information encapsulating the packet. If the network device is a multi-layer switch, the multi-layer switch includes functionality to process packets using both MAC addresses and IP addresses.

In one embodiment of the invention, the persistent storage in the network device may include any type of non-transitory computer readable medium that includes instructions, which, when executed by one or more processors in the network device, enable the network to perform the functions described in accordance with one or more embodiments of the invention (see e.g., FIGS. 1B, 1C, 2A, 2B, 4 and 5). Additional detail about the network devices are described below.

In one embodiment of the invention, the cloud layer (100) provides a centralized layer in which network device information (NDI) (described below) from the network devices is received and stored. In addition, the cloud layer (100) provides access to the NDI information for analysis (both local and external analysis) (see e.g., FIG. 4). The cloud layer (100) may also include functionality to modify the operation of one or more network devices (see e.g., FIGS. 4 and 5).

In one embodiment of the invention, the cloud layer includes a computer cluster (102), an Application Programming Interface (API) server (108), one or more cloud layer applications (106), an ingest gateway (104), and one or more search servers (110). Each of the aforementioned components may be executing on one or more computing systems (see e.g., FIG. 6). Each of these components is described below.

In one embodiment of the invention, the computer cluster (102) includes one or more connected computing systems (see e.g., FIG. 6) that store the network device information (NDI) obtained from the network devices. In one embodiment of the invention, the computer cluster may be implemented using any distributed storage system (e.g., Ceph), any distributed compute system (e.g., YARN, Gearman, Sidekiq, etc.) and/or any distributed database system (e.g., HBase, Cassandra, etc.). Further, embodiments of the invention may be implemented on parallel processing systems that implement centralized management (e.g., Apache™ Hadoop®) or implement distributed management (e.g., Cassandra).

In one embodiment of the invention, the computer cluster (102) includes functionality to interface with the other components in the cloud layer (100). In addition, the computer cluster may implement one or more APIs to permit external applications (112A, 112M) to directly access the NDI stored in the computer cluster and/or to permit direct communication between the computer cluster and the external applications.

In one embodiment of the invention, the ingest gateway (104) includes functionality to receive NDI from the various network devices and provide the NDI to the computer cluster for storage. In order to implement the above functionality, the ingest gateway (104) may include sufficient capacity to at least temporarily store the received NDI prior to the NDI being stored in the computer cluster. The ingest gateway, in some embodiments of the invention, may process the received NDI prior to sending the NDI to the computer cluster for storage. Further, the ingest gateway may implement one or more APIs in order for the network devices to send NDI to the cloud layer (100). The ingest gateway may also include functionality to receive one or more modification instructions from a cloud layer application (106) and/or from an external application (via the API server) and to send modification instructions to the one or more network devices (see e.g., FIGS. 4 and 5).

In one embodiment of the invention, the cloud layer may include one or more cloud layer applications (106). The cloud layer applications (106) correspond to applications that are executing in the cloud layer (100) as opposed to applications executing external to the cloud layer (see e.g., external applications (112A, 112M). The cloud layer applications include functionality to obtain NDI from the computer cluster and to perform analysis on the received NDI (see e.g., FIG. 4). Based on the analysis, the cloud layer application may initiate one or more actions (see e.g., FIG. 4). Unlike the external applications (112A, 112M), the cloud layer applications may be available to all users of the system. In contrast, the external applications (112A, 112M) may be only available to the certain users of the system. For example, a company may use the cloud layer to obtain NDI for the network devices it operates and then use an external application (that includes its own proprietary analysis algorithm) to analyze the aforementioned NDI. In such cases, the analysis performed by the external application would not available to all users of the system; rather it would only be available to the users designated by the company (i.e., the company's network administrators).

In one embodiment of the invention, the API server (108) exposes one or more APIs to one or more external applications (112A, 112M). More specifically, the interaction between the external applications and the various components in the cloud layer (100) may be mediated by the API server. In such embodiments, the API server may include functionality to issue API keys, receive API requests (which include an API call and the appropriate API key), and the service the API requests. Servicing API requests may include verifying the API key and/or verifying that the user of the external application that issued the API request is authorized to make such an API request (see e.g., FIG. 5). Examples of API requests may include, but are not limited to, requests to obtain NDI from the computer cluster and requests to modify the operation of one or more network devices. Additional detail about the operation of the API server is described in FIG. 5 below.

In one embodiment of the invention, the cloud layer (100) includes one or more search servers. The search servers (110) include functionality to index the NDI stored in the computer cluster. Further, the search servers include functionality to receive search requests from components within and external to the cloud layer and to service the search requests. The search requests may specify, for example, certain network devices, groups of network devices, specific types of NDI, etc. The NDI retrieved in response to a search request may vary based on the request entity (e.g., cloud layer application, external application, etc.) that issued the search request and/or the specific type of analysis that the requesting entity intends to perform on the retrieved NDI.

In one embodiment of the invention, a $3^{rd}$ party device (114) corresponds to any type of computing system (see e.g., FIG. 6) that is configured to interact with the cloud layer applications(s), the external application(s), and the network devices. For example, the $3^{rd}$ party device may be a smart phone of an administrator. In this example, the administrator may have configured a cloud layer application to monitor the network devices in a data center and when any of the network devices begin to operate outside a given set of normal operating parameters (specified by the administrator), the cloud layer application is configured to send a notification to an application executing on the smart phone. The administrator may then review the notification and issue a modification instruction (described below) (see FIG. 5) directly (or via the cloud layer) to one or more network devices.

In one embodiment of the invention, external applications (112A, 112M) are applications executing on one or more computing systems (see e.g., FIG. 6) that are external to the cloud layer. The external applications include functionality to obtain NDI from the computer cluster and to perform analysis on the received NDI (see e.g., FIG. 4). Based on the analysis, the external applications may initiate one or more actions (see e.g., FIGS. 4 and 5).

In one embodiment of the invention, the NDI stored in the cloud layer (100) may include NDI for network devices for a single legal entity (i.e., an individual, company, partnership, corporation, etc.) or NDI for network devices for multiple legal entities. In the later scenario, the NDI may be stored in a manner that maintains the confidentiality of the NDI. More specifically, the NDI for a given legal entity may only be accessible for analysis by individuals/applications associated with the legal entity. In other implementations, the given legal entity may have complete access to its own NDI (i.e., NDI that is associated with network devices associated with the legal entity) and may have limited access to NDI associated with network devices associated with the legal entities. The limited access to NDI may correspond to only a subset of NDI associated with network devices associated with other legal entities being made available. Alternatively, limited access to NDI may correspond to anonymization of the NDI associated with network devices associated with other legal entities and then providing access to the anonymized NDI.

In one embodiment of the invention, the NDI may be stored in a secure manner in the computer cluster. More specifically, the NDI may be stored in encrypted form using any known or later discovered encryption technology.

Figure 1B:
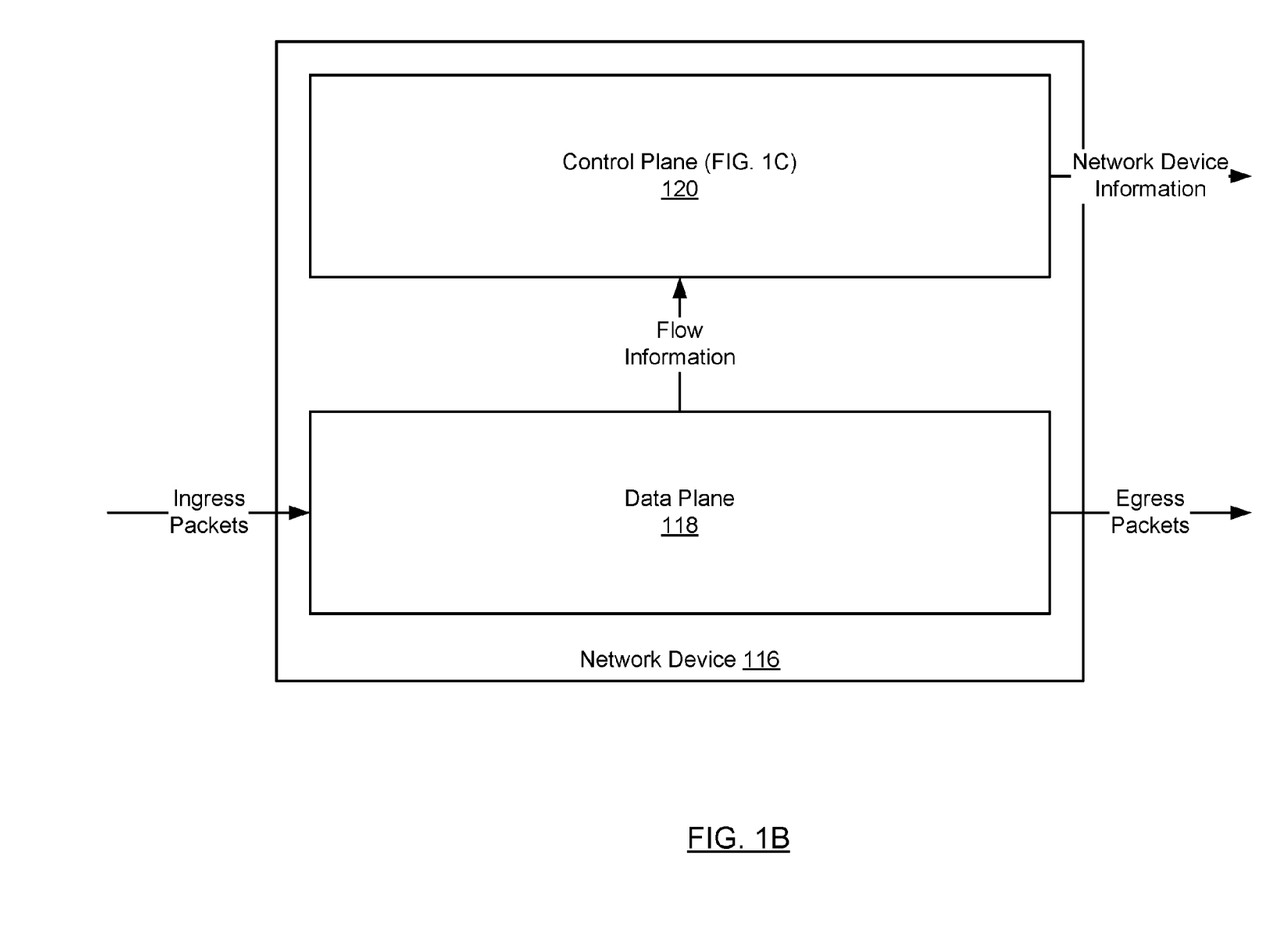
FIG. 1B shows a network device in accordance with one or more embodiments of the invention.

FIG. 1B shows a network device in accordance with one or more embodiments of the invention. The network device (116) includes a data plane (118) and a control plane (120). The data plane includes functionality to receive packets (denoted as ingress packets) via ports (not shown), process the packets (as described above) and, as appropriate, transmit packets (denoted as egress packets) via the ports towards a destination. The data plane (118) also includes functionality to gather flow information and to provide this flow information to the control plane (120). In one embodiment of the information, the flow information corresponds to copies of sampled packets (i.e., a sampling of packets that are received by the data plane). The flow information may also include information related to queue depths on ingress and egress buffers (not shown) in the data plane. In one embodiment of the invention, the flow information is collected in accordance with sFlow.

In one embodiment of the invention, the control plane (120) includes functionality to manage the overall operation of the network device. More specifically, the control plane includes functionality to manage the operation of data plane (including programming of the forwarding table). The control plane may also include functionality to gather and send network device information (NDI) to the cloud layer (see FIG. 2A, 2B). In addition, the control plane may also include functionality to receive modification instructions from the cloud layer and process the received modification instructions (see e.g., FIG. 5). Additional detail about the control plane is described in FIG. 1C.

Figure 1C:
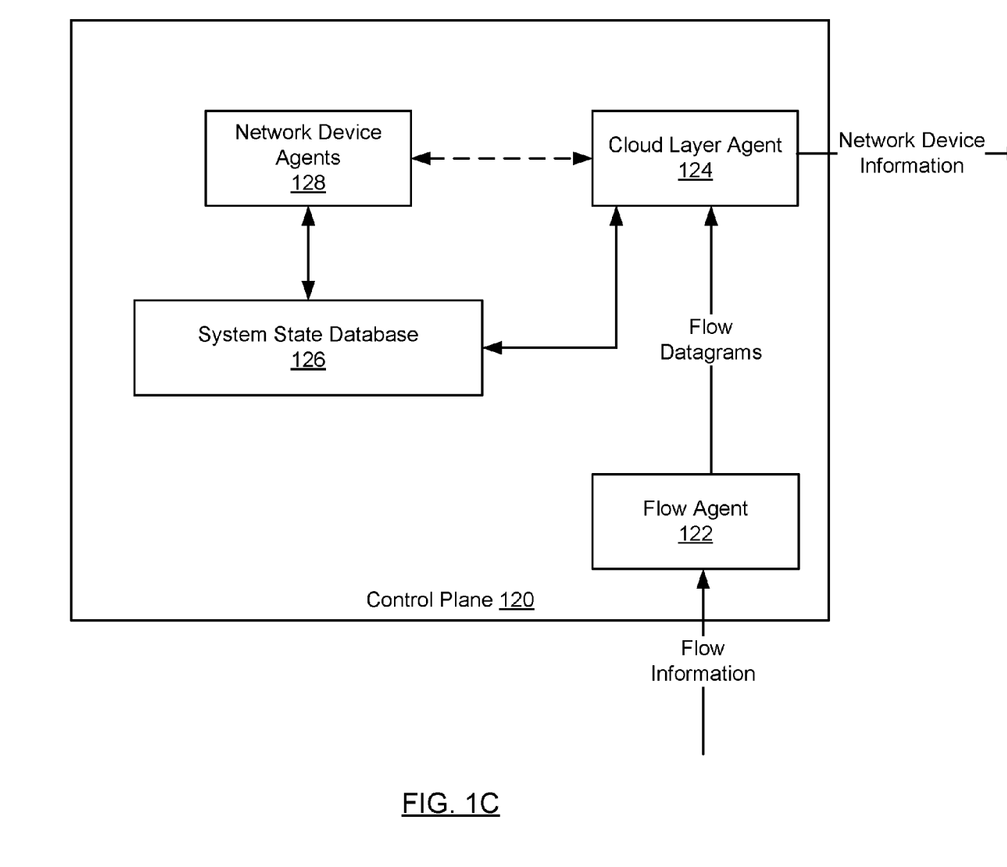
FIG. 1C shows a control plane of a network device in accordance with one or more embodiments of the invention.

FIG. 1C shows a control plane of a network device in accordance with one or more embodiments of the invention. The control plane (120) may include a cloud layer agent (124), one or more network device agents (128), and a system state database (126). Each of these components is described below.

In one embodiment of the invention, each of the network device agents (128) implements one or more protocols and/or services of the network device. Examples of network device agents include, but are not limited to, a command line interface agent, a routing information base agent, a forwarding information base agent, a simple network management protocol (SNMP) agent, etc.

The system state database (126) includes shared memory that includes the current state of the network device. More specifically, system state database may include all values in all data structures used by any of the network device agents. For example, the system data database may include the current routes table entries as determined by the routing information base agent. In one embodiment of the invention, the system state database stores the aforementioned information in records within the system state database, where each record includes at least the name of the variable (or name of the parameter), the current value of the variable (or parameter), and a timestamp indicating when the record was created (or last modified). Examples of the types of information that may be stored in the system state database include, but are not limited to, information related to the configuration of network interfaces, VLANs used by the network device, IP addresses used by the network device, DNS information, NTP information, information about the routing policy(ies) implemented on the network device, information about any QoS scheme implemented on the network device, the contents of the current MAC address table, VXLAN table, the contents of the ARP table, the contents of the routing table, information about readings obtained from various sensors, e.g., temperature sensors, voltage sensors, and power sensors.

In one embodiment of the invention, each of the network device agents includes functionality to access various portions of the system state database in order to obtain the relevant portions of the state of the network device in order to perform various functions. In addition, the network device agents include functionality to update the state of the network device by writing new and/or updated values into the system state database.

In one embodiment of the invention, the flow agent (122) includes functionality to obtain the flow information from the data plane (118), aggregate the flow information (as appropriate) and generate one or more flow datagrams based on the aggregated information. The flow agent may subsequently provide the flow datagrams to the cloud layer agent (124). Aggregated information may include, but is not limited to, For example aggregate statistics on traffic based on destination port, source IP, originating AS (Autonomous System) number of the source IP, distribution of the size of the packets, other summary statistics based on various flags/headers in the packets.

In one embodiment of the invention, the cloud layer agent includes functionality to: (i) obtain the state of the network device and any updates to the state of the network device, (ii) obtain flow datagrams from the flow agent, and (iii) and then provide the information obtained in (i) and (ii) to the cloud layer. The information collected in (i) and (ii) may be collectively referred to as network device information (NDI). The cloud layer agent may include functionality to send NDI to the cloud layer anytime there is a change in state of the network device (e.g., any time there is a change of any value in any portion of the system state database). The cloud layer agent may also include functionality to send NDI to the cloud layer each time the cloud layer agent receives a flow datagram. In one embodiment of the invention, the NDI that is sent to cloud layer is tagged with a timestamp (or another sequence number). The NDI may also be sent in batches (i.e., groups of individual NDI) without departing from the invention.

The invention is not limited to the system architecture shown in FIGS. 1A-1C.

Figure 2A:
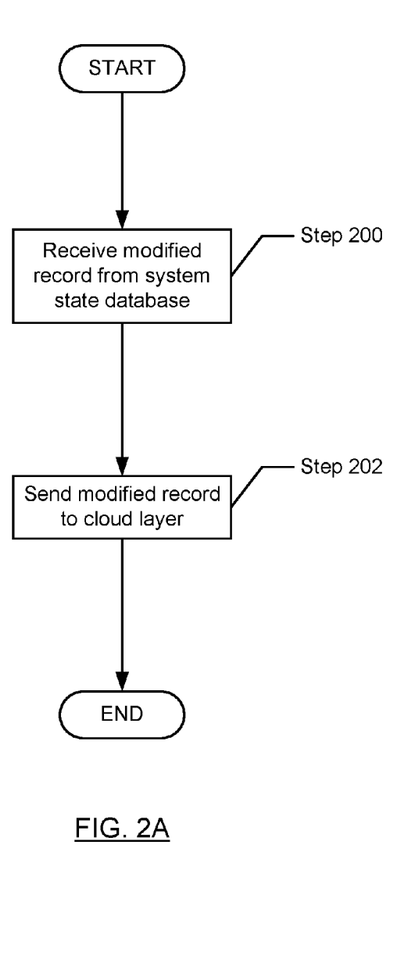
FIGS. 2A and 2B show methods for obtaining network device information from network devices in accordance with one or more embodiments of the invention.
Figure 2B:
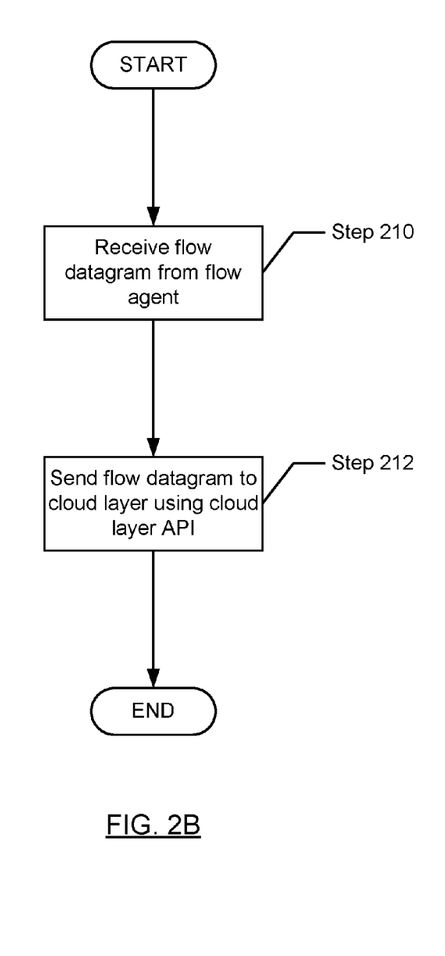

FIGS. 2A and 2B show methods for obtaining network device information from network devices in accordance with one or more embodiments of the invention. More specifically, FIG. 2A shows a method for sending network device information (in the form of modified records) to the cloud layer in response to a change in the system state database in accordance with one or more embodiments of the invention.

In step 200, a modified record from the system state database is received by the cloud layer agent. More specifically, in one embodiment of the invention, whenever there is a change in any record in the system state database, the modified record is sent to the cloud layer agent. In another embodiment of the invention, the cloud layer agent may periodically poll the system state database to obtain any records that are currently marked as being modified.

In step 202, the modified record received/obtained in step 200 is subsequently sent to the cloud layer. In one embodiment of the invention, the modified record is sent to an ingest gateway in the cloud layer. As discussed above, the cloud layer agent may temporarily buffer the modified records and send a set of modified records (instead of a single modified record).

Turning to FIG. 2B, FIG. 2B shows a method for sending network device information (in the form of flow datagrams) to the cloud layer in accordance with one or more embodiments of the invention.

In step 210, a flow datagram is received from the flow agent. The flow agent may send flow datagrams to the cloud layer agent whenever a new flow datagram(s) is generated. Alternatively, the cloud layer agent may periodically request new flow datagrams from the flow agent.

In step 212, the flow datagram(s) received/obtained in step 210 is subsequently sent to the cloud layer. In one embodiment of the invention, the flow datagram is sent to an ingest gateway in the cloud layer.

Figure 3A:
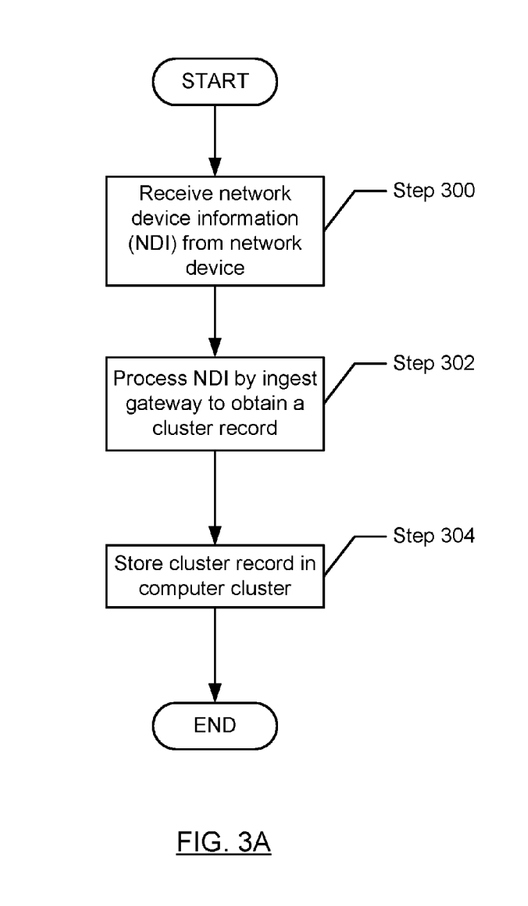
FIGS. 3A and 3B show methods for processing network device information obtained from network devices in accordance with one or more embodiments of the invention.
Figure 3B:
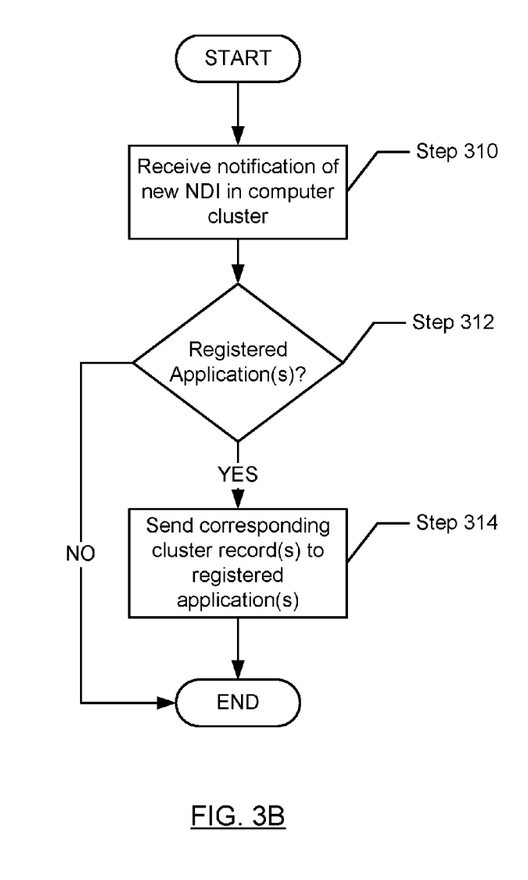

FIGS. 3A and 3B show methods for processing network device information obtained from network devices in accordance with one or more embodiments of the invention. More specifically, FIG. 3A shows a method for storing the received network device information into the computer cluster.

In step 300, an ingest gateway receives network device information (NDI) (e.g., in the form of a modified record or a flow datagram) from a network device.

In step 302, the NDI is subsequently processed by the ingest gateway to generate a cluster record. In one embodiment of the invention, a cluster record includes at least the NDI, information to identify the network device from which it was obtained (e.g., a MAC address of the network device), and a timestamp. The timestamp may indicate when the NDI was generated by the network device. For example, if the NDI is a flow datagram (or information extracted from a flow datagram), then the time stamp may correspond to a timestamp that was generated at the time the flow datagram was created on the network device. Further, if the NDI is a modified record from the system state database, then the timestamp may correspond to the time when the modified record was created on the network device (i.e., when the value of a parameter or variable changed in order to create the modified record). In one embodiment of the invention, NDI received from a network device may result in the creation of multiple cluster records. For example, if the NDI is a flow datagram, then various information from the flow datagram may be extracted and used to generate various different cluster records. In one embodiment of the invention, the content and format of the cluster records may vary based on the implementation without departing from the invention.

In step 304, the cluster record(s) generated in step 302 are stored in the computer cluster. The manner in which the cluster record(s) is stored may vary based on the implementation of the computer cluster.

Turning to FIG. 3B, FIG. 3B shows a method for notifying registered applications of the presence of new network device information (NDI) in the computer cluster in accordance with one or more embodiments of the invention.

In step 310, a process in the computer cluster that is monitoring the state of the content in the computer cluster may receive a notification when a new cluster record(s) is stored in the computer cluster.

In step 312, upon receipt of this notification, a determination is made about whether there are any applications (i.e., cloud layer applications or external applications) that have registered to receive the cluster record that has been modified. For example, an application may be configured to receive a notification every time a temperature reading of a given temperature sensor in a network device changes. If a determination is made that there are no registered applications for this cluster record, then the process ends; otherwise, the process proceeds to step 314.

In one embodiment of the invention, an application may be registered to receive new cluster records associated with a specific parameter in the network device. In another embodiment of the invention, an application may be registered to receive new cluster records for a given network device that includes temperature readings in the network device. In another embodiment of the invention, an application may be registered to receive all new cluster records for a given network device(s). Continuing with the discussion of FIG. 3, in step 314, the cluster record(s) are obtained from the computer cluster and provided to the registered application(s).

While FIG. 3B describes a mechanism in which notifications of new cluster records are "pushed" to registered applications, in another embodiment of the invention, the applications (i.e., the cloud layer applications and the external applications) may implement a "pull" mechanism in which the application periodically requests various cluster records from the computer cluster.

Figure 4:
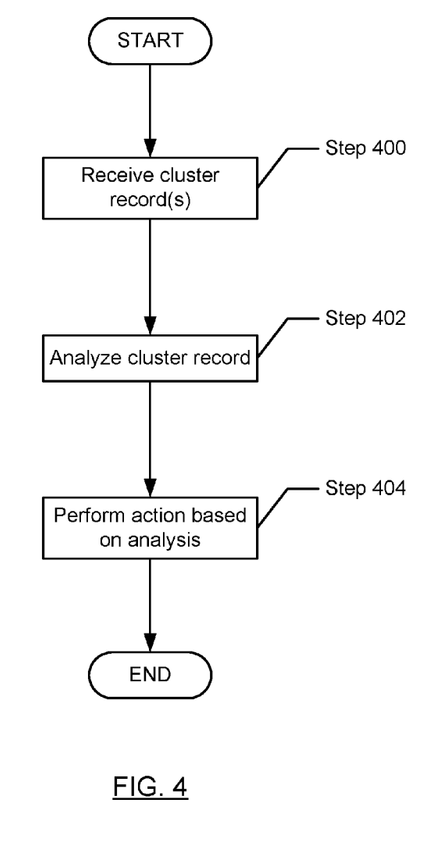
FIG. 4 shows a method for analyzing network device information stored in the cloud layer in accordance with one or more embodiments of the invention.

FIG. 4 shows a method for analyzing network device information stored in the cloud layer in accordance with one or more embodiments of the invention. The method described in FIG. 4 may be performed by the cloud layer applications and/or the external applications.

In step 400, one or more cluster records are received (or obtained) from the computer cluster. The cluster records may be obtained in accordance with FIG. 3B. Alternatively, various cluster records may be requested from the computer cluster. In one embodiment of the invention, the application that is requesting the cluster records must have sufficient permission to access the requested cluster records. In such cases, the computer cluster (or another component on the cloud layer) may first determine whether the application requesting the cluster records is permitted to access the cluster records. If so, the cluster records are provided to the application.

In step 402, the cluster records are analyzed by the application. The applications may perform any known or later analysis on the cluster records. Non-limiting examples of various types of analysis are described below.

In step 404, zero, one or more actions are performed based on the results analysis performed in step 402. In one embodiment of the invention, the actions may result in the modification of the operation of one or more network devices. More specifically, the action may include issuing an instruction to one or more networking devices, where the instructions, when executed on the network devices, result in a change in operation of the network devices. In another embodiment of the invention, an action may correspond to issuing notifications to, e.g., the network administrators and/or updating data structures with information about the network that resulted from the analysis in step 402. Non-limiting examples of actions are described below.

Example 1

Consider a scenario in which there is a cloud layer application that includes a listing of the various bugs that impact the performance of the network devices. The listing of bugs may include (i) bugs that occur when the network device is within a given state, and (ii) bugs that occur when a set of network devices is configured in a certain manner. With respect to bugs under (ii), these bugs are related to how network devices in a given network topology are working together as opposed to how each of the network devices is working on its own. Said another way, the bugs under (ii) may occur even when the individual network devices within the network topology are working properly.

Continuing with the example, the application may obtain the cluster records and perform an analysis to determine, based on the state of the individual network devices, if any of the bugs under (i) are applicable/present in a network device. If so, the application may issue a notification to a network administrator advising them of the bug and a recommendation for correcting the bug and/or trigger the obtaining additional information about the state of the network device and then creating a new cluster record with the additional information about the state of the network device and storing this new cluster record in the cloud layer. The application may subsequently compare the original cluster record (i.e., the cluster record which triggered the generation of the new cluster record) with the new cluster to determine, e.g., how the state of network device has changed. Alternatively, the application may automatically trigger modification of the operation of the network device. For example, the modification may be to a network agent (e.g., a modification to how a network agent implements a network protocol) and/or to a value of a parameter or variable in the system state database.

In addition, the application may analyze the cluster records to determine if any of the bugs under (ii) are present in the set of network devices being monitored. More specifically, because the cloud layer includes NDI from multiple connected network devices, the applications may determine the network topology of the network devices, the current state of each of the network devices, and how packets are flowing through the various network devices. Given this level of visibility into the state and operation on the network devices, the application may determine, based on the current configuration of the network devices and their current individual states, that the network devices collectively may be susceptible to a bug under (ii). In response to this determination, the application may issue a notification to a network administrator advising them of the bug and a recommendation for correcting the bug. Alternatively, the application may automatically trigger modification of the operations to one or more of the network devices.

Example 2

Consider a scenario in which an external application includes functionality to analyze the flow of packets through a series of network devices and then determine which entries need to be included in the routing table and/or in the forwarding table in order to optimize the flow of packets through the series of network devices. In such cases, the external application may obtain a set of cluster records that include the current state of the routing tables and/or forwarding tables in a series of interconnected network devices. The external application may also obtain cluster records that include information about the destination of the packets (e.g., as determined by the destination IP address) for packets that are currently flowing through the aforementioned network devices. The external application may then determine table entry usage information (i.e., which routes are most frequently used in the aforementioned network devices) in order to determine which route table entries and/or forwarding table entries need to be present in the routing table or the forwarding table, respectively. Once this determination is made, the external application (via the method described in FIG. 5) may modify the routing tables and/or forwarding tables of one or more network devices such that that the routing tables and/or forwarding tables include at least the most frequently used routes. The process of determining the most frequently used routes may be performed periodically.

Example 3

Consider a scenario in which an external application includes functionality to analyze the flow of packets through a series of network devices, determine which network devices are congested (e.g., which network devices are dropping packets). The external application, using the above information, may then determine how to modify (or correct) the flow of packets through the network in order to minimize the congestion within the network. The above determination may include identifying which entries in the various routing tables and/or forwarding tables need to modified or removed in order to modify (or correct) the number of packets being transmitted to the congested network devices. For example, if there are three network devices (ND1, ND2, ND3) that are identified as transmitting packets to a congested network device, then routing and/or forwarding tables (and/or other tables such as the an ARP table, a MAC table, a VXLAN table) in two of the three network devices (e.g., ND1 and ND2) may be modified such that these network devices do not send any packets to the currently congested network device. Accordingly, following the modification to ND1 and ND2, the congested network device is only receiving packets from ND3.

Example 4

Consider a scenario in which an external application is used to conduct post mortem analysis when a network device fails. In this scenario, the external application may obtain all cluster records that correspond to the current state of the network device immediately prior to its failure. The external application may also obtain cluster records that describe the flows (as determined using flow datagrams) that were currently being processed by the network device at the time of failure. A user, using the external application, may then be able to determine the cause of the failure of the network device using the aforementioned information.

Example 5

Consider a scenario in which a cloud layer application receives NDI from various network devices in the network and then uses the NDI to generate a global view of the network. The global view of the network may include, for example, all network devices in the network, the network topology (i.e., how the network devices are connected), what protocols are executing on each of the network devices, the configuration of each of the network devices, the contents of the routing table and/or forwarding table for each of the network devices, etc. The global view of the network may be generated and/or updated over time as NDI is received from the various network devices. Further, the global view of the network may be presented, for example, via a graphical user interface (GUI) to, for example, a network administrator. In this example, the action may be to (i) generate the global view; (ii) update the global view; and/or (iii) present the global view to, for example, the network administrator.

In one embodiment of the invention, once the global view has been generated, additional analysis may be performed by one or more cloud layer applications and/or one or more external applications. The result of the additional analysis may be to modify the operation of one or more network devices in the network. The operation of one or more network devices in the network may be modified in order to, for example, load balance traffic across the network and/or to optimize another aspect of the network.

In one embodiment of the invention, once the global view has been generated (and subsequently updated based on later received NDI), an external application and/or the cloud layer application may use the global view in order to determine how to implement a change (or a modification) initiated by, for example, a network administrator. More specifically, the global view may be analyzed in order to determine which of the network devices need to be updated in order to implement the change requested by the network administrator. Further, the external application and/or the cloud layer application may also determine how to modified each of the aforementioned identified network devices in order to implement the change requested by the network administrator.

Figure 5:
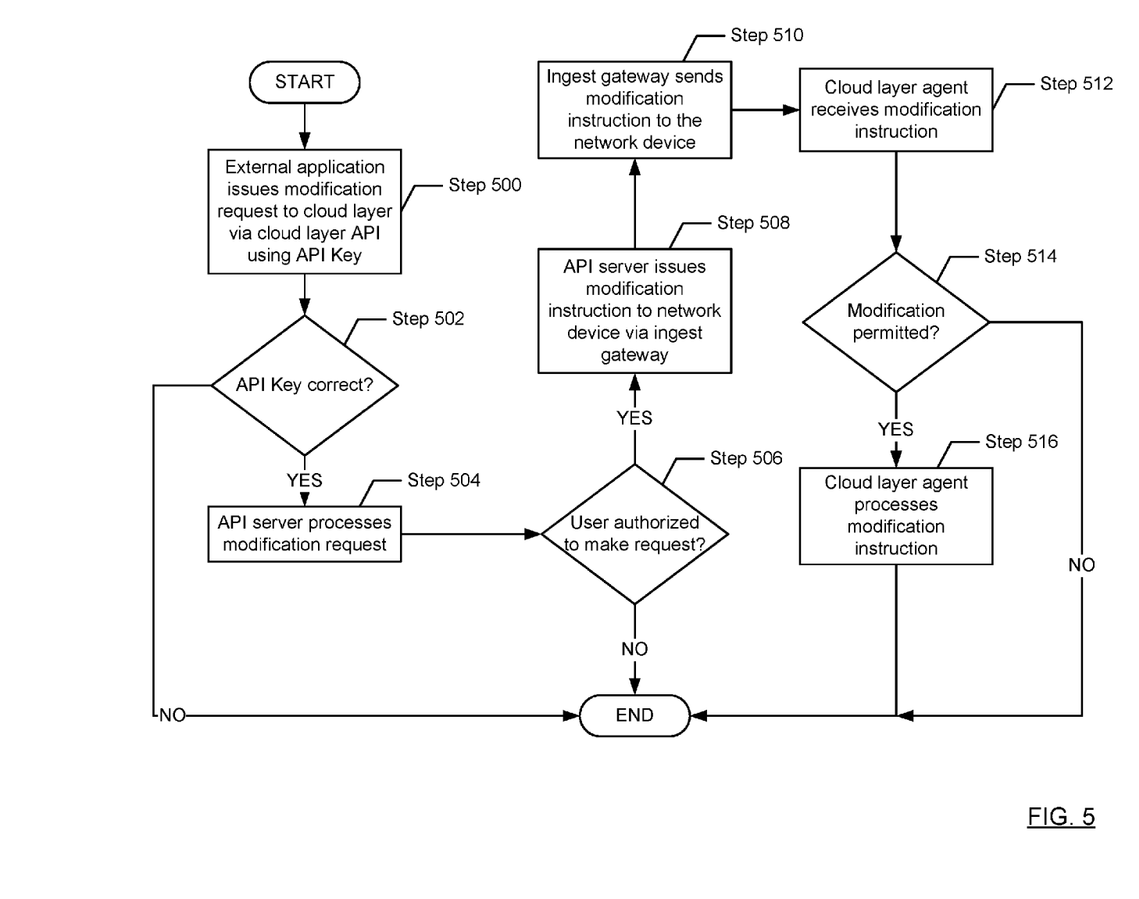
FIG. 5 shows processing modification requests received by external applications in accordance with one or more embodiments of the invention.

FIG. 5 shows processing modification requests received by external applications in accordance with one or more embodiments of the invention.

In step 500, a modification request is issued by an external application. The modification request is received by the cloud layer via a cloud layer API that is implemented by an API server in the cloud layer. The modification request may include an API key, information to identify the network device, and specify the modifications being requested (which may include new values for variables and/or parameters in the system state database). The modification request may include other information without departing from the invention.

In step 502, a determination is made about whether the API key is correct. If the API key is not correct, the process ends; otherwise, the process proceeds to step 504.

In step 504, the API server processes the modification request. The modification request may include a request to change the manner in which the network device operates. In one embodiment of the invention, processing the modification request may include determining the external application that issued the modification request and/or the user that issued the modification request via the external application. Processing the modification request may also include determining what portion(s) of the network device are to be modified based on the modification request.

In step 506, the API server, after performing the processing described in step 504, determines whether the requested modification(s) to the network device is allowed. The determination in step 506 may be based on, for example, the type of modification being requested, the external application that made the request, and/or the user of the external application that made the request. Other factors may be considered in the determination of step 506 without departing from the invention. If the modification being requested is permitted, then the process proceeds to step 508; otherwise, the process ends.

In step 508, the API server generates and issues one or more modification instructions to the ingest gateway. The modification instructions correspond to instructions that may be processed by the cloud layer agent on the network device.

In step 510, the ingest gateway receives the modification instruction(s) and sends the modification instruction to the appropriate network device.

In step 512, the cloud layer agent receives the modification instruction(s).

In step 514, the cloud layer agent determines whether the modification instruction is permitted. In one embodiment of the invention, step 514 may be included as an additional level of security to ensure that only permitted modifications to the network device are implemented. If the modification instruction is permitted, then the process proceeds to step 516; otherwise, the process ends.

In step 516, the cloud layer agent processes the modification instruction. Processing the modification instruction may include, for example, updating the system state database, and/or providing the modification instruction to the appropriate network agent to process.

Figure 6:
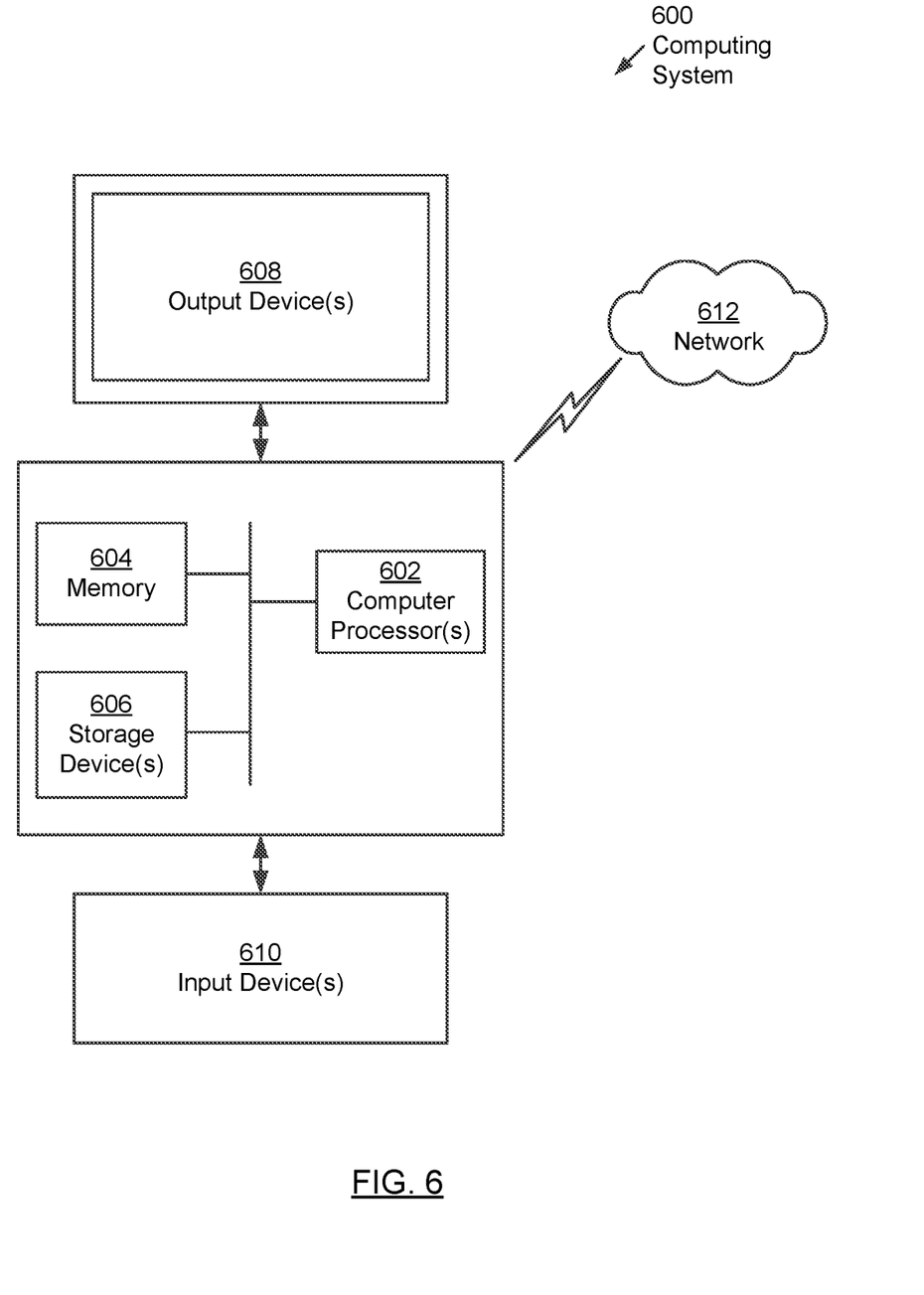
FIG. 6 shows a computer system in accordance with one or more embodiments of the invention.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network device information, comprising:
    receiving network device information (NDI) from a plurality of network devices;
    storing the NDI in a computer cluster;
    after storing the NDI, determining that a first application is registered to receive the NDI;
    providing the NDI to the first application;
    analyzing, by the first application, the NDI, wherein analyzing, by the first application, the NDI, comprises:
        determining, using at least the NDI, a current state for the plurality of network devices and a network topology to obtain a collective configuration of the plurality of network devices;
        identifying, that a bug that is based on the collective configuration is present within the plurality of network devices; and
    performing, based on the analysis, a first action.

2. The method of claim 1, further comprising:
    after storing the NDI, determining that a second application is registered to receive the NDI;
    providing the NDI to the second application;
    obtaining an NDI analysis from the second application; and
    initiating, based on the NDI analysis, a second action to be performed on at least one of the plurality of network devices.

3. The method of claim 2, wherein the second application is an external application, and wherein initiating the second action comprises issuing a modification request using an application programming interface (API) that is exposed by a cloud layer, wherein the cloud layer is interposed between the plurality of network devices and the external application.

4. The method of claim 1, wherein performing the first action comprises performing an action on at least one of the plurality of network devices.

5. The method of claim 1,
    wherein performing the first action comprises:
        providing information about the bug to an administrator of the plurality of network devices.

6. The method of claim 1, further comprising:
    analyzing, by a second application, the NDI; and
    performing, based on the analysis by the second application, a second action,
    wherein analyzing, by the second application, the NDI, comprises:
        determining, using at least the NDI, table entry usage information for the plurality of network devices; and
        identifying a set of table entries for at least one of the plurality of network devices based on the table entry usage information, and
    wherein performing the second action comprises:
        instructing, by the first application, the at least one of the plurality of network devices to update a table in the at least one of the plurality of network devices to include the set of table entries, wherein the table is one selected from a group consisting of an ARP table, a MAC table, a VXLAN table, a routing table and a forwarding table.

7. The method of claim 1, further comprising:
    analyzing, by a second application, the NDI; and
    performing, based on the analysis by the second application, a second action,
    wherein analyzing, by the second application, the NDI, comprises:
        determining, using at least the NDI, congestion within a first network device of the plurality network devices, and
    wherein performing the second action comprising:
        instructing, by the first application, a second network device to modify an entry in a table in order to not transmit packets to the first network device, wherein the table is one selected from a group consisting of a routing table and a forwarding table.

8. The method of claim 1, wherein the NDI comprises at least one selected from a group consisting of system state data for at least one of the plurality of network devices and flow datagrams from at least one of the plurality of network devices.

9. The method of claim 1, wherein the computer cluster implements a distributed database system.

10. The method of claim 9, wherein the distributed database system is HBase.

11. The method of claim 1, wherein at least one of the plurality of network devices is a switch.

12. A system, comprising:
a computing system comprising a processor and a memory, wherein the computing system is operatively connected to a plurality of network devices and to an application,
wherein the memory, accessible to the processor, stores instructions,
wherein the instructions execute on the processor to enable the computing system to:
receive network device information (NDI) from the plurality of network devices;
store the NDI in a computer cluster;
after storing the NDI, determine that the application is registered to receive the NDI;
provide the NDI to the application;
receive a first NDI analysis from the application; and
perform, based on the first NDI analysis, a first action; and
the application programmed to:
receive the NDI from the computing system;
analyze the NDI to obtain the first NDI analysis; and
provide the first NDI analysis to the computing system,
wherein, to analyze the NDI, the application is further programmed to:
determine, using at least the NDI, a current state for the plurality of network devices and a network topology to obtain a collective configuration; and
identify that a bug that is based on the collective configuration is present within the plurality of network devices.

13. The system of 12, wherein the computing system is coupled to an external application and wherein the instructions executing on the processor further enable the computing system to:
after storing the NDI, determine that the external application is registered to receive the NDI;
provide the NDI to the external application;
obtain a second NDI analysis from the external application; and
initiate, based on the second NDI analysis, a second action to be performed on at least one of the plurality of network devices.

14. The system of claim 12,
wherein, to perform the first action, the instructions executing on the processor further enable to computing system to:
provide information about the bug to an administrator of the plurality of network devices.

15. The system of claim 12, further comprising:
a second application,
wherein the instructions executing on the processor further enable the computing system to:
provide the NDI to the second application,
receive a second NDI analysis from the second application, and
perform, based on the second NDI analysis, a second action,
wherein performing the second action comprises:
instructing, by the second application, a network device of the plurality of network devices to update a table in the network device to include a set of table entries, the table being a routing table or a forwarding table,
wherein the second application is programmed to:
receive the NDI from the computing system;
analyze the NDI to obtain the second NDI analysis; and
provide the second NDI analysis to the computing system,
wherein, to analyze the NDI to obtain the second NDI analysis, the second application is further programmed to:
determine, using at least the NDI, table entry usage information for the plurality of network devices, and
identify a set of table entries for at least one of the plurality of network devices based on the table entry usage information.

16. The system of claim 12, wherein the computer cluster implements a distributed database system.

17. The system of claim 16, wherein the distributed database system is HBase.

18. A non-transitory computer readable medium comprising computer readable program code, which when executed by a processor enables the processor to:
receive network device information (NDI) from a plurality of network devices;
store the NDI in a computer cluster;
after storing the NDI, determine that a first application is registered to receive the NDI;
provide the NDI to the first application;
analyze, by the first application, the NDI,
wherein, to analyze the NDI, the first application is programmed to:
determine, using at least the NDI, a current state for the plurality of network devices and a network topology to obtain a collective configuration of the plurality of network devices, and
identify that a bug that a bug that is based on the collective configuration is present within the plurality of network devices; and
perform, based on the analysis, a first action.

19. The non-transitory computer readable medium of claim 18, further comprising computer readable program code, which when executed by the processor enables the processor to:
after storing the NDI, determine that a second application is registered to receive the NDI;
provide the NDI to the second application;
obtain an NDI analysis from the second application; and
initiate, based on the NDI analysis, a second action to be performed on at least one of the plurality of network devices.

20. The non-transitory computer readable medium of claim 18, wherein performing the first action comprises performing an action on at least one of the plurality of network devices.

* * * * *

UNITED STATES PATENT AND TRADEMARK OFFICE
CERTIFICATE OF CORRECTION

PATENT NO. : 10,187,286 B2
APPLICATION NO. : 15/162189
DATED : January 22, 2019
INVENTOR(S) : Benoit Sigoure Page 1 of 1

It is certified that error appears in the above-identified patent and that said Letters Patent is hereby corrected as shown below:

In the Claims

Column 15, Line 38, the start of Claim 13, should read -- The system of claim 12 --.

Column 15, Line 51, in Claim 14, the phrase "enable to computing system" should read -- enable the computing --.

Column 16, Line 42, in Claim 18, the phrase "identify that a bug that a bug is based" should read -- identify that a bug is based --.

Signed and Sealed this
Twenty-eighth Day of May, 2019

Andrei Iancu
*Director of the United States Patent and Trademark Office*